C. M. MANLY.
POWER TRANSMISSION DEVICE.
APPLICATION FILED MAR. 13, 1911. RENEWED JULY 10, 1916.

1,238,927.

Patented Sept. 4, 1917.
3 SHEETS—SHEET 1.

Attest:
S. Newman
Ada J. Miller by
W. B. Morton

Inventor:
Charles M. Manly,
Atty

C. M. MANLY.
POWER TRANSMISSION DEVICE.
APPLICATION FILED MAR. 13, 1911. RENEWED JULY 10, 1916.
1,238,927.
Patented Sept. 4, 1917.
3 SHEETS—SHEET 2.
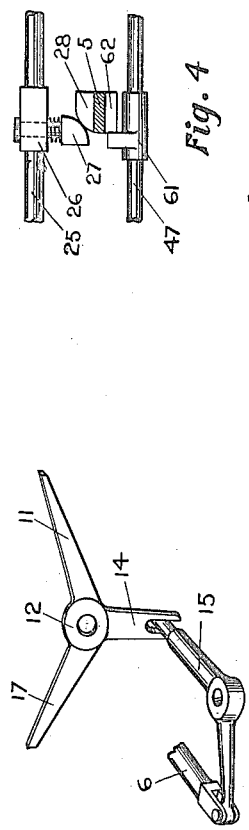
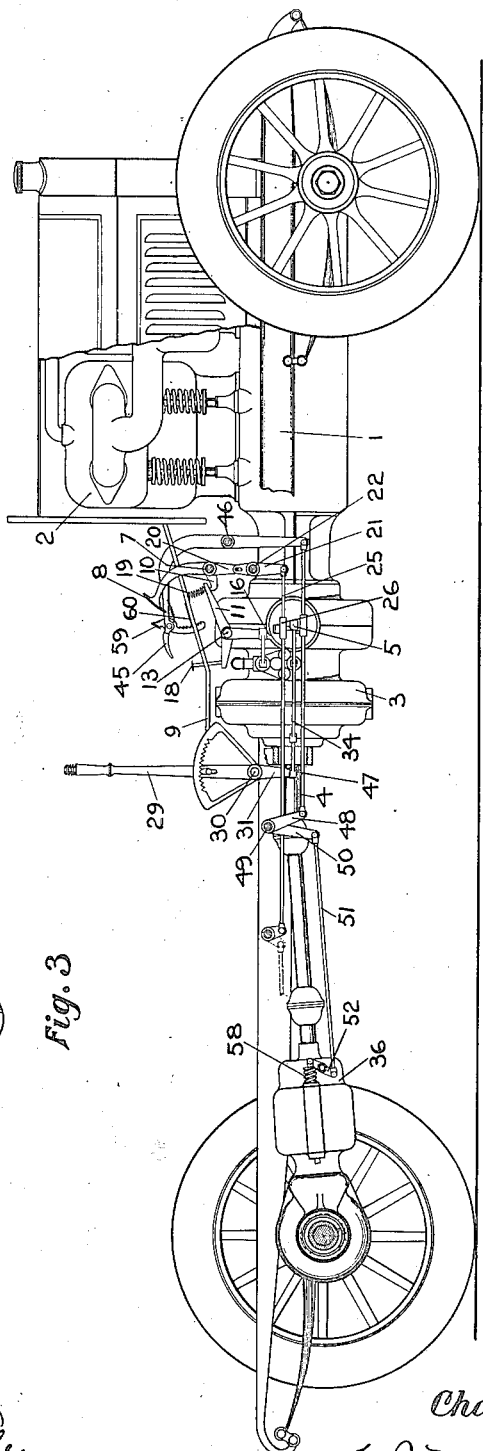
Fig. 2
Attest:
J. Newman
Ada L. Miller
Inventor:
Charles M. Manly,
W. B. Morton
Atty C. M. MANLY.
POWER TRANSMISSION DEVICE.
APPLICATION FILED MAR. 13, 1911. RENEWED JULY 10, 1916.

1,238,927.

Patented Sept. 4, 1917.
3 SHEETS—SHEET 3.

UNITED STATES PATENT OFFICE.

CHARLES M. MANLY, OF BROOKLYN, NEW YORK.

POWER-TRANSMISSION DEVICE.

1,238,927.  Specification of Letters Patent.  Patented Sept. 4, 1917.

Application filed March 13, 1911, Serial No. 614,131.  Renewed July 10, 1916.  Serial No. 108,449.

*To all whom it may concern:*

Be it known that I, CHARLES M. MANLY, a citizen of the United States, residing at Brooklyn, county of Kings, and State of New York, have invented certain new and useful Improvements in Power-Transmission Devices, of which the following is a specification.

My invention relates to power transmission devices and more particularly to transmission devices embodying a variable speed hydraulic gear of the type disclosed in my application Serial No. 525,925 dated Nov. 2, 1909. A hydraulic speed gear of the type referred to comprises a variable stroke pump to be driven by the prime mover and a hydraulic motor so connected with the pump that the pump, motor and connections form a closed circuit which is maintained full of oil or some other incompressible fluid. The speed of the motor is determined by the volume of flow in the fluid circuit and variations in speed are effected by varying the stroke of the pump. With hydraulic power the power transmitted is measured by the volume of fluid circulated multiplied by the pressure, hence, assuming the power transmitted to be constant, it follows that any decrease in the volume circulated is accompanied by a corresponding increase in pressure. Therefore the maximum torque which may be obtained by decreasing the volume of fluid circulated is limited to such pressure on the fluid as is within a safe working strength of the pump and motor and their connecting passages. It is therefore customary to provide hydraulic transmission devices of this type with a safety valve adapted to short circuit the pump when the pressure of the fluid reaches the maximum permitted by the strength of the parts.

Most machines which start under load require a larger driving torque to start them than to keep them running even at full speed but some machines, particularly motor vehicles which meet with varying conditions of running, require at times considerably more driving torque than is usually required even for starting. To meet these conditions with a hydraulic transmission as at present constructed, a transmission has to be provided which is much larger and stronger than is necessary for normal running conditions and it is the principal object of my invention to provide means whereby the range of torques exerted on the driven member may be at times increased without increasing the pressure on the fluid of the hydraulic transmission so that a transmission of proper size for normal conditions may be employed and yet be able to overcome abnormal resistances.

A further object of my invention is to provide means for controlling the transmission whereby certain of the shifting mechanisms can be operated only when the parts of the transmission are in such relative positions that no damage can result from the shifting.

A further object of the invention is to provide a transmission of the character described which is simple in construction and efficient in operation.

In the accompanying drawings and annexed specifications I have disclosed a preferred embodiment of my invention as applied to a motor vehicle, but it is to be understood that my invention is not limited to such application, or to the details of construction here disclosed but covers all such modifications of the same as fall within the scope of the appended claims.

In the drawings,

Fig. 2 is a side elevation of the mechanism shown in Fig. 1, certain parts being shown in section.

Figs. 3 and 4 are detail views hereinafter referred to.

Figure 1:
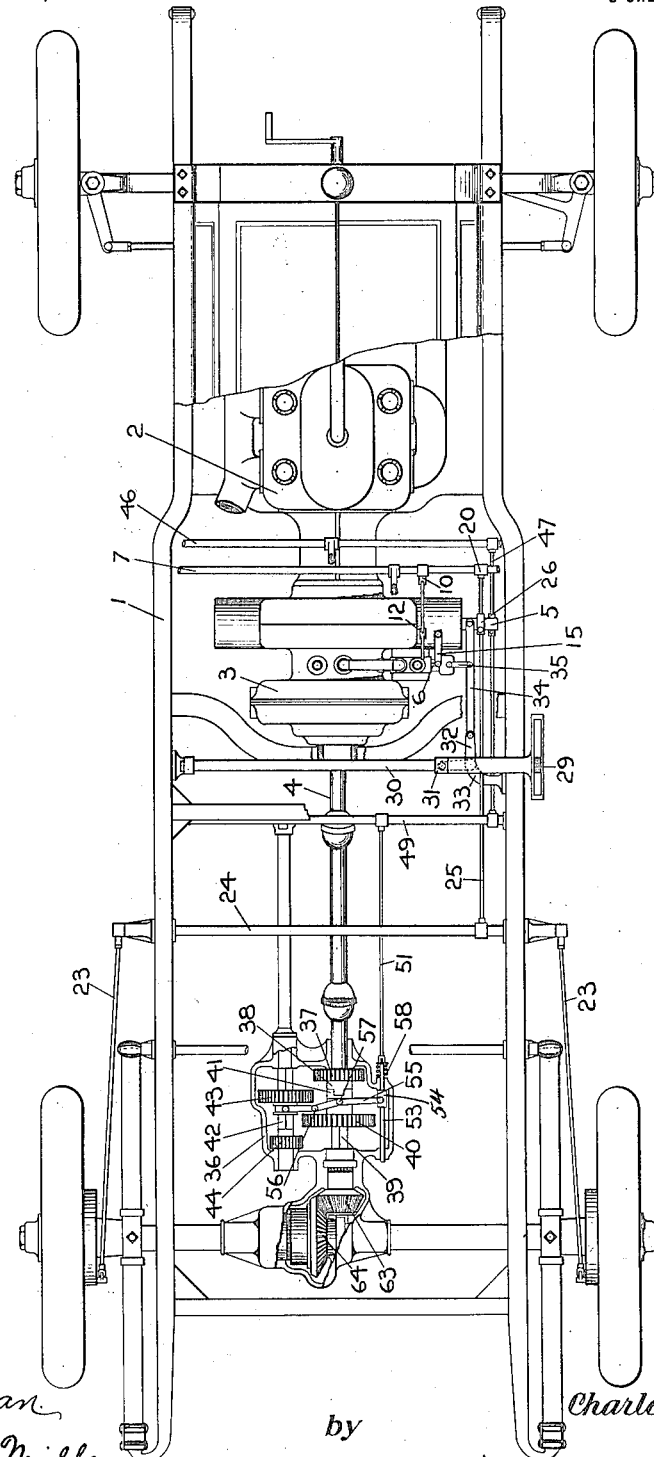
Figure 1 is a plan view of the chassis of a motor vehicle equipped with my invention.
Figure 6:
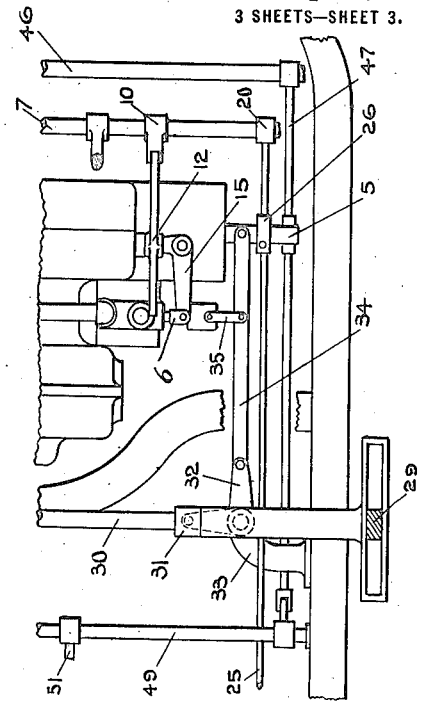
Figs. 5, 6 and 7 are detail views on an enlarged scale of the controlling devices of the hydraulic and the reducing gears.
Figure 5:
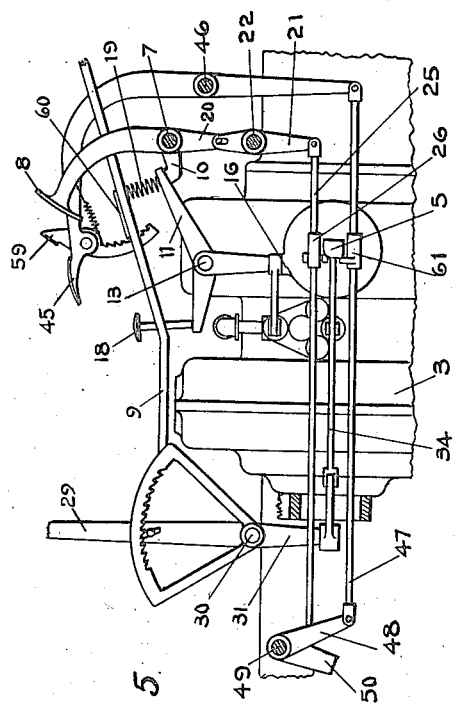
Figure 7:
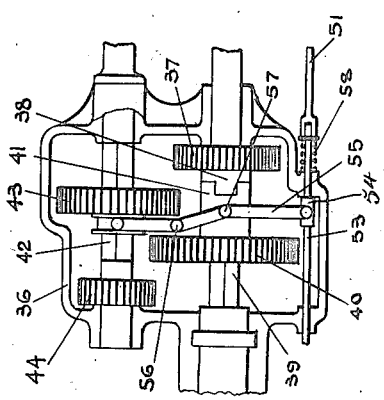

In the drawings in which like characters indicate like parts throughout the several views, 1 indicates the frame of the vehicle, 2 the engine and 3 the casing of the hydraulic transmission. The transmission selected for this application is the same as that shown in detail in my application above referred to and the details of the same are not therefore shown in the drawings of this case, but a brief description of so much of the mechanism as is necessary for an understanding of my present invention will now be given. In the forward part of the casing 3 a multi-cylinder fluid pressure pump driven directly from the engine shaft is mounted, and connected thereto by fluid passages inclosed by the middle part of the casing is a hydraulic motor, also of the multi-cylinder type, the motor being mounted in the rear part of the casing and having driving connection with the shaft 4. In order to control the speed and direction of movement of the motor, the pump is provided with mechanism whereby the stroke of its pistons may be varied so as to cause the fluid in circulation to vary from a maximum amount flowing in one direction through zero to a maximum amount flowing in the reverse direction, and this mechanism is controlled by a bar 5 adapted to be reciprocated transversely of the vehicle by mechanism hereinafter described. The bar 5 has a neutral position corresponding to the zero position of the pump, and movement of the bar in either direction from this position causes the pump to force oil to the motor in the corresponding direction and in quantities proportionate to the extent of movement of the bar. The passages of the fluid circuit are provided with a by-pass valve 6 adapted when opened to short-circuit the pump and motor to permit independent operation of either.

All the above described mechanism is disclosed in my application above referred to and constitutes so much thereof as is necessary to an understanding of the present invention, which will now be described.

Rotatably mounted in the frame in front of the casing 3 is a shaft 7 provided with a pedal 8 projecting through the foot board 9. Rigidly mounted on the shaft 7 adjacent the pedal is an arm 10 projecting rearwardly from the shaft and engaging under an arm 11 of a three-arm lever 12 pivoted to the pump casing at 13 as shown. A second arm 14 of the lever extends downwardly from the pivot 13 and is operatively connected to one arm of a bell-crank 15, pivoted on the pump casing at 16 for movement in a horizontal plane. The other arm of the bell-crank 15 is connected to the stem of the by-pass valve 6 in such manner that counter clockwise movement of the 3-arm lever 12 opens the valve thereby permitting the pump and motor to run free of each other. The third arm 17 of the three-arm lever is provided with a push bolt 18 extending through the foot board 9, and a spring 19 is arranged between the arm 11 and the foot board to hold the by-pass valve closed and the push bolt in its elevated position.

Also rigidly attached to the shaft 7 at a point near one end is a depending arm 20, which arm is connected by a pin and slot connection with the upper end of a brake operating lever 21 pivoted on a stud 22 projecting from the pump casing. The brakes may be of any desired type and are here shown merely in outline as of the internal expanding type. They are operated in the usual manner by rods 23 connected to a rocking shaft 24, which shaft is connected to the brake lever 21 by a rod 25 so that counter clockwise movement of the lever 21 rocks the shaft 24 in the direction to apply the brakes. The rod 25 extends over the stroke control bar 5 as shown in Figs. 2 and 4 and attached to the rod in a position adjacent the bar is a clamp collar 26 provided with a spring pressed pawl 27 adapted to snap over in front of the bar 5 when the brake is applied and the by-pass valve opened by the operation of the pedal 8. The purpose of this mechanism is to hold the parts against return movement until the control bar 5 is moved to set the pump at its zero position, in which position of the control bar a slot 28 in the upper side of the bar registers with the pawl and permits the brakes to release and the spring 19 to close the by-pass valve.

For operating the control bar 5 to control the speed and direction of movement of the vehicle, a lever 29 is provided. This lever is attached to the projecting end of a rocking shaft 30 carried by the vehicle frame. Also attached to shaft 30 is a depending arm 31 operatively connected to a bell-crank 32, pivoted for movement in a horizontal plane on bracket 33 attached to the frame. The bell-crank 32 is connected to the control bar 5 by means of a lever 34 fulcrumed on the pump casing by the links 35.

The shaft 4 is driven by the hydraulic motor and extends rearwardly into a gear casing 36 supported in any convenient manner by the rear axle and the vehicle frame. The shaft is of the usual jointed construction and has attached to its end beyond the bearing of the gear casing, a spur gear 37 provided with a rearwardly extending clutch member 38. Mounted in the gear casing 36 in alinement with the shaft 4 is a shaft 39 having a forwardly projecting squared portion on which is slidingly mounted a spur gear 40 provided with a clutch member 41, adapted to engage the clutch member 38. A shaft 42 is mounted in the gear casing parallel to the shaft 39 and slidingly mounted on the shaft 42 is a gear 43 adapted to mesh with the gear 37. A second gear 44 adapted to mesh with gear 40 is fixed to shaft 42. The shaft 39 has attached to its rear end beyond its bearing a bevel gear 63 meshing with the bevel gear 64 of the usual differential on the rear axle, which is also inclosed in the gear case 36. The gears 37, 40, 43 and 44 are so proportioned that when the gear 37 is in mesh with gear 43 and the gear 40 is in mesh with the gear 44, the shaft 39 is driven at about one third the speed of the shaft 4.

For shifting the gears 40 and 43 a link and lever mechanism is provided which is operated by a pedal lever 45 attached to a shaft 46 rotatably mounted in the frame below the foot board 9. This mechanism consists of a rod 47 connected at one end to the lower end of the pedal lever 46 and at its other end to an arm 48 attached to a rocking shaft 49 mounted in the frame to the rear of the hydraulic motor. Attached to the shaft 49 is a second arm 50, connected by means of a rod 51 to a lever 52 mounted on the side of the casing 36. This lever is connected to and adapted to reciprocate a rod 53 mounted in the casing 36 and attached to the rod 53 is a block 54 to which is pivoted a lever 55, fulcrumed at 56 in the casing. The lever 55 is connected to the hub of the sliding gear and clutch member 40, 41 and 57 and at its free end to the sliding gear 43 so that movement of the lever simultaneously shifts both gears. A spring 58 is arranged on the rod 53 to hold the gears out of mesh and the clutch members in engagement.

The pedal lever 45 is provided with a locking member 59 engaging a plate 60 on the foot board so that the pedal may be held depressed and the gears held in engagement without holding the pedal with the foot. Attached to the rod 47 at the point where the rod passes under the control bar 5 is a clamp collar 61 having an upstanding lug adapted to engage either side of the bar to prevent movement of the rod and consequently prevent the gears being shifted except when the lug is in alinement with a groove 62 on the under side of the bar 5, the groove being cut at a position to register with the lug when the bar is at its zero position.

The operation of the transmission is as follows:

Assuming the road conditions to be fair and the load not excessive, the operator can start the vehicle (after starting his engine) with the elements of the reducing gear mechanism set for direct driving as shown in Fig. 1, by moving the pump control lever 29 out of its zero position in the direction it is desired to travel. If it is desired to stop the vehicle it may be done either by returning the lever 29 to the zero position or by opening the by-pass valve 6 and setting the brakes by means of the pedal 8 as fully described above. When the latter method is employed the pump continues in motion with its stroke set for normal running speed and should the by-pass valve be closed and the brakes released with the pump so set the vehicle would be started too suddenly with possible damage and loss of control. To prevent the operator inadvertently starting the vehicle without first setting the pump at its zero position the brake rod 25 is provided with the clamp collar and the pawl 26, 27 which holds the valve open and the brakes set until the control bar 5 is moved to its zero position. The push bolt 18 is provided so that the by-pass valve may be opened without setting the brake to permit the vehicle to coast.

Should the vehicle encounter an unusual grade or bad roads necessitating a driving torque greater than permitted by the safety valve of the hydraulic transmission when coupled for direct driving the operator can set the reducing gears in their low speed position by means of the pedal 45 and locking member 59, thereby reducing the speed of the driving wheels relatively to the motor shaft 4 so that the same pressure in the hydraulic transmission will exert a correspondingly greater torque on the driving wheels. When the conditions again become normal the operator may return the parts to their direct driving position, but should he do this while the gears are in motion they would probably be broken or damaged and to prevent this the rod 47 is provided with the clamp collar 61 having the lug to engage on either side of the control bar 5 and prevent the gears being shifted either into or out of engagement except when the control bar is set in its zero position where the groove 62 registers with the lug on collar 61.

When the vehicle is driven through the reducing gear it is still capable of the sensitive control permitted by the hydraulic gear when driving direct, and as the toothed gears cannot be shifted except when the parts are stationary the disadvantages resulting from the use of this form of gear alone are avoided.

What I claim is:

1. In a power transmission mechanism the combination with a hydraulic transmission embodying a variable capacity pump and a motor driven by the fluid therefrom, of a variable speed gear transmission driven by the motor of the hydraulic transmission and operatable to drive the part to be driven at different speeds in the same direction of rotation, substantially as described.

2. In a power transmission mechanism the combination with a hydraulic transmission of a variable speed gear transmission, of means for controlling the hydraulic transmission and means coöperating therewith for controlling said gear transmission, substantially as described.

3. In a power transmission mechanism the combination with a variable speed hydraulic transmission embodying a driving member and a driven member of a device to be operated and means for optionally connecting said device directly to the driven member of said transmission or through the medium of a reducing gear, to drive said device in the same direction.

4. In a power transmission mechanism the combination with a variable speed hydraulic transmission embodying a driving member and a driven member and means for varying the driving ratio of said member by imperceptible degrees, of a part to be operated, and means for connecting said part either directly to the said driven member or through the medium of a reducing gear as desired, to drive said device in the same direction.

5. In a power transmission mechanism the combination with a variable speed hydraulic transmission, embodying a variable capacity pump and a motor operated by the fluid pressure from the pump, of a part to be driven, a clutch between the rotatable part of said motor and said part to be driven, a reducing gear between said parts for driving them in the same direction, and means for simultaneously shifting said clutch and gear.

6. In a power transmission mechanism, the combination of a variable speed hydraulic transmission embodying a variable capacity pump and a motor operated by the fluid pressure from the pump whereby the torque of the motor is limited to a safe working pressure of the fluid, of means for connecting said motor directly to the part to be driven, and means operatable at will for connecting the motor to the part to be driven, to drive the same at a reduced speed in the same direction whereby the torque exerted by the driven part may be increased without increasing the fluid pressure in the hydraulic transmission.

7. In a power transmission mechanism the combination with a hydraulic transmission of a variable speed gear transmission and means to prevent shifting of the gear transmission except when the hydraulic transmission is inoperative, substantially as described.

8. In a power transmission mechanism the combination with a variable speed hydraulic transmission embodying a variable stroke pump having means comprising a shiftable member for varying its stroke from zero to a maximum, of a variable speed gear transmission having a shiftable control member controlled by the shiftable member of the stroke varying means, substantially as described.

9. In a power transmission mechanism the combination with a hydraulic transmission embodying a driving and a driven member and a shiftable member for rendering said driven member inoperative, of a variable speed gear transmission and means for preventing shifting of said gear transmission except when the driven member of said hydraulic transmission is inoperative, substantially as described.

10. In a power transmission mechanism, the combination with a hydraulic transmission embodying a variable capacity pump, and a motor driven by the fluid therefrom, of a variable speed gear transmission and means for preventing shifting of the gear transmission except when the hydraulic transmission is inoperative, substantially as described.

11. In a power transmission mechanism the combination with a hydraulic transmission embodying a variable capacity pump having means for varying its capacity from zero to a maximum and a motor driven by the fluid therefrom, of a variable speed gear transmission driven by said motor, means for shifting the elements of said gear transmission, and means coöperating with the pump capacity varying means to prevent shifting of the gear elements except when the pump is in its zero position, substantially as described.

12. In a motor vehicle, the combination of a power generator, a variable capacity pump driven thereby, a motor driven by the fluid therefrom, a variable speed gear transmission driven by said motor, driving wheels for said vehicle driven by said gear transmission, a brake mechanism, means for varying the capacity of said pump and means coöperating therewith to prevent the release of the brake and the shifting of the elements of the gear transmission except when said capacity varying means is in a predetermined position, substantially as described.

13. In a motor vehicle the combination of a power generator, a variable capacity pump driven thereby, a motor driven by the fluid therefrom, a by-pass valve for short circuiting said pump, a variable speed gear transmission driven by said motor, driving wheels for said vehicle driven by said gear transmission, a brake mechanism for said vehicle, means for operating said by-pass valve and said brake mechanism, means for shifting the elements of said gear transmission, means for varying the capacity of said pump, and means for preventing closing of the by-pass valve and releasing the brake mechanism and shifting the elements of said gear transmission except when the capacity varying means is at a predetermined position, substantially as described.

14. In a power transmission, the combination of a variable speed gear comprising a driving member and a driven member, and means for varying the driving ratio of said members through a wide range for securing a sensitive speed control of the part to be driven, and means for connecting said part to be driven either directly to the driven member or through the medium of a reducing gear to drive said part in the same direction as when directly connected.

In testimony whereof, I have signed my name to this specification in the presence of two subscribing witnesses, this 11th day of March 1911.

CHARLES M. MANLY.

Witnesses:
SIGMUND NEWMAN,
ADA I. MILLER.